USO09516389B1

(12) United States Patent
Cheng et al.

(10) Patent No.: US 9,516,389 B1
(45) Date of Patent: Dec. 6, 2016

(54) ON SCREEN DISPLAY DETECTION

(75) Inventors: Guohua Cheng, Shanghai (CN); Bob Zhang, Santa Clara, CA (US); Neil Woodall, Newport Beach, CA (US); Jian (James) Zhou, San Jose, CA (US)

(73) Assignee: PIXELWORKS, INC., Portland, OR (US)

( * ) Notice: Subject to any disclaimer, the term of this patent is extended or adjusted under 35 U.S.C. 154(b) by 425 days.

(21) Appl. No.: 12/966,894

(22) Filed: Dec. 13, 2010

(51) Int. Cl.
*H04N 5/50* (2006.01)
*H04N 21/485* (2011.01)
*H04N 5/44* (2011.01)

(52) U.S. Cl.
CPC ........ *H04N 21/485* (2013.01); *H04N 21/4854* (2013.01); *H04N 5/4403* (2013.01)

(58) Field of Classification Search
CPC ........... H04N 2005/44517; H04N 2005/44539; H04N 21/4316; H04N 21/482; H04N 19/70; H04N 21/4622; H04N 5/44543; H04N 21/4383; H04N 21/4312; G09G 1/165; G09G 1/167
See application file for complete search history.

(56) References Cited

U.S. PATENT DOCUMENTS

| | | | | |
|---|---|---|---|---|
| 5,495,295 | A * | 2/1996 | Long | 348/563 |
| 6,339,451 | B1 * | 1/2002 | Tults | 348/569 |
| 7,782,401 | B1 * | 8/2010 | Chou | 348/581 |
| 8,064,522 | B2 * | 11/2011 | Kondo et al. | 375/240.16 |
| 8,144,255 | B2 * | 3/2012 | Hirayama et al. | 348/701 |
| 8,233,085 | B1 * | 7/2012 | Liu | 348/441 |
| 2004/0207758 | A1 * | 10/2004 | Sai et al. | 348/627 |
| 2006/0233448 | A1 * | 10/2006 | Pace et al. | 382/236 |
| 2006/0285010 | A1 * | 12/2006 | Wang et al. | 348/452 |
| 2007/0047652 | A1 * | 3/2007 | Maruyama et al. | 375/240.16 |
| 2007/0057049 | A9 * | 3/2007 | Kundu et al. | 235/383 |
| 2008/0025390 | A1 * | 1/2008 | Shi et al. | 375/240.02 |
| 2009/0251555 | A1 * | 10/2009 | McCloskey | 348/222.1 |
| 2010/0013988 | A1 * | 1/2010 | Hulyalkar et al. | 348/441 |
| 2011/0109796 | A1 * | 5/2011 | Subedar et al. | 348/459 |
| 2011/0246329 | A1 * | 10/2011 | Geisner et al. | 705/27.1 |

OTHER PUBLICATIONS

Seung-Chul Yoon and Narendra Ahuja, Frame Interpolation Using Transmitted Block-Based Motion Vectors, 2001, Image Processing, vol. 3, pp. 856-859.*

* cited by examiner

*Primary Examiner* — John Schnurr
*Assistant Examiner* — Cynthia Fogg
(74) *Attorney, Agent, or Firm* — Marger Johnson

(57) ABSTRACT

An on-screen display (OSD) processing system can include video data fetch modules to receive video data from a video source, edge detection modules to detect an edge of a region within a scene represented by the video data, edge processing modules to process results from the edge detection modules, and an OSD confidence level adjustment module to adjust an OSD confidence level corresponding to the region within the scene.

19 Claims, 4 Drawing Sheets

400

| A | B | C |
|---|---|---|
| D | E | F |
| G | H | I |

FIG. 4

ON SCREEN DISPLAY DETECTION

TECHNICAL FIELD

The disclosed technology pertains to digital video processing, and more particularly to improved techniques for video frame interpolation in situations where on-screen displays (OSDs) are involved.

BACKGROUND

Broadcast video signals often include semi-transparent channel identification information that can be presented to a viewer by way of an on-screen display (OSD). Video processors generally output data for the OSD as an overlay of processed image data. OSDs can be used for various purposes in addition to providing the user with channel identification information. For example, OSDs can provide viewers with the ability to control settings for the display device itself, which is typically a monitor or television, or for other devices that are in communication with the display device such as a digital video recorder (DVR).

While video sources typically have frame rates of 24 or 30 frames per second, display devices such as televisions and monitors generally have refresh rates of 60 Hz, 120 Hz, 240 Hz, etc. Because the display devices are refreshed or updated at a higher rate than the video source, video frame interpolation is often employed to reduce or prevent negative impact on the clarity and smoothness of the video presented to the user by the display device.

Video frame interpolation generally involves creating intermediate frames between original frames received from the video source. For example, motion vectors (MVs) can be calculated for changes between two successive video frames received from the video source. These motion MVs can then be used to create the intermediate frames by interpolating the motion of the video between the two successive frames. If the underlying area of a transparent OSD is moving during the frame rate conversion process, no MV is correct for this kind of region. If a non-zero MV is used for the OSD region, there are two kinds of artifacts that will typically appear. The first artifact manifests itself as a broken OSD. The second artifact involves presenting a dirty background with the OSD to the viewer.

Accordingly, a need remains for improved video frame interpolation in situations that involve OSDs.

BRIEF DESCRIPTION OF THE DRAWINGS

FIG. 4 is a graphical representation of a window dilation operation in accordance with embodiments of the disclosed technology.

DETAILED DESCRIPTION

Embodiments of the disclosed technology may be implemented to improve on-screen display (OSD) performance in situations that involve video frame interpolation processing. In certain embodiments, a method can be used to detect the edge of a semi-transparent or opaque OSD edge and still-caption edge. Because an OSD typically has stationary edges around the OSD, the method can include detecting this edge recursively in the motion vector component (MVC). For each pixel of an input image, for example, the method can yield a confidence value for the OSD edge after multi-frame detection. The method can then include marking the block having an OSD edge with a high confidence level or surrounded by high confidence level OSD edges as an OSD block. The method can then include using a zero MV (0MV) for this OSD block.

In certain implementations, an OSD detection system can be used to detect stationary edges in a scene established by a series of video frames and designate or otherwise mark the area surrounding the stationary edges as an OSD region. The system can mark the area as an OSD area if the stationary edge remains present over the course of several successive video frames, for example. In certain embodiments, the designating or marking of the surrounding area as an OSD region can be performed during the motion vector calculation phase.

Figure 1:
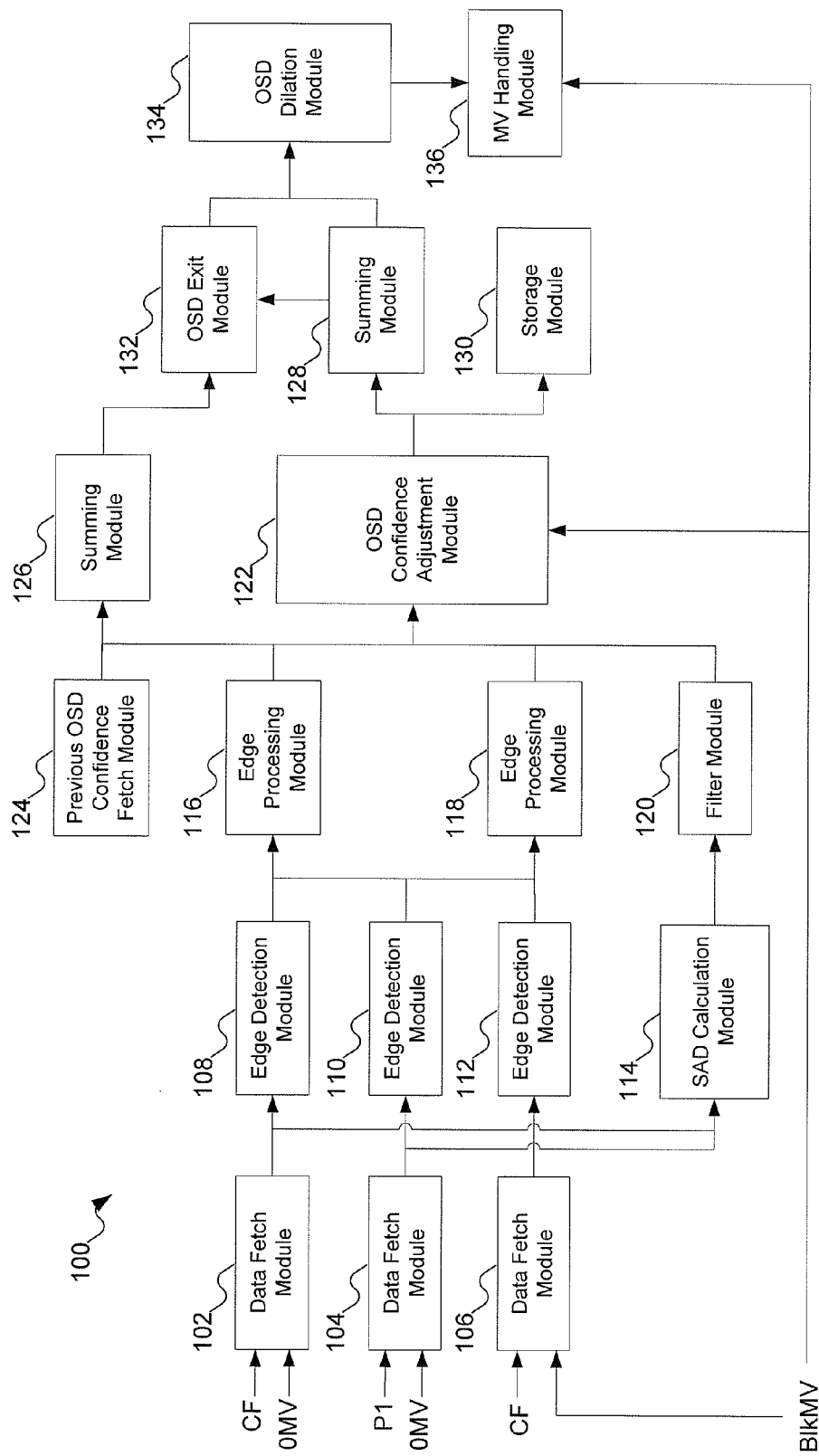
FIG. 1 is a block diagram illustrating an example of an on-screen display (OSD) processing system in accordance with embodiments of the disclosed technology.

FIG. 1 is a block diagram illustrating an example of an on-screen display (OSD) processing system 100 in accordance with embodiments of the disclosed technology. In the example, the OSD processing system 100 implements a method of performing OSD detection during motion estimation from a first previous video frame (P1) to a current video frame (CF). The OSD processing system 100 includes three data fetch modules 102, 104, and 106 that are configured to fetch certain video data from a video source and provide the fetched data as input data to corresponding edge detection modules 108, 110, and 112, respectively.

In certain embodiments, one of the data fetch modules 102 can fetch data according to zero MV (0MV) to obtain image data from the current frame, another data fetch module 104 can fetch data according to 0MV to obtain image data from the first previous frame, and the third data fetch module 106 can fetch data according to a selected MV in the motion vector component (MVC), which will be referred to herein as BlkMV, to obtain image data from the current frame.

The second edge detection module 110 can perform edge detection for the P1 image according to 0MV. A detected OSD edge by the module 110 will typically have a large value and is referred to as the P1Edge value. The first edge detection module 108 can perform edge detection for the CF image according to 0MV. In situations where there exists a stationary edge in the scene, the edge will typically be detected by both of these edge detection modules 108 and 110.

In the example, the third edge detection module 112 can perform edge detection for the CF image according to the MV calculated in the MVC. In certain embodiments, to reduce cost, OSD edge detection can be performed on a down-sampled image. If a OSD edge detected by the third edge detection module 112 is a moving edge, then the output of the second edge detection module 110, which is referred to as P1Edge, can be matched with the output of the third edge detection module 112, which is referred to as CFM-VEdge. So, for an OSD edge, a value MinEdgeS (the output of a first edge processing module 116, discussed below) will typically be larger than a value MinEdgeM (the output of a second edge processing module 118, also discussed below). For a non-OSD edge, however, the value MinEdgeM will typically be larger than the value MinEdgeS. If the value of BlkMV is close to zero, then the value of MinEdgeM will typically be close to the value of MinEdgeS.

The first and second data fetch modules 102 and 104 also pass the fetched data on to a sum of absolute difference (SAD) calculation module 114. The SAD calculation module 114 can be used to calculate a difference between the first previous frame (P1) image with 0MV and the current (CF) image with 0MV in a window around the current pixel, for example. The SAD calculation module 114 can generate a result, which is referred to herein as Mtn, to denote the motion between the P1 image and the CF image. A filter module 120 can be used to apply a filter, such as a low pass filter, to the result Mtn of the SAD calculation module 114 to reduce negative influence contributed by noise, for example.

In the example, the output of the first edge detection module 108, which is referred to as CFEdge, and the output of the second edge detection module 110, which is referred to as P1Edge, are both sent to a first edge processing module 116. The output of the second edge detection module 110 (P1Edge) and the output of the third edge detection module 112, which is referred to as CFMVEdge, are both sent to a second edge processing module 118. The first edge processing module 116 can perform a minimal operation on CFEdge and P1Edge, and the second edge processing module 118 can perform a minimal operation on P1Edge and CFMVEdge.

The output of the first edge processing module 116, which is referred to as MinEdgeS, and the output of the second edge processing module 118, which is referred to as MinEdgeM, are both sent to an OSD confidence adjustment module 122. The output of the filter module 120 (Mtn) is also sent to the OSD confidence adjustment module 122.

A previous OSD confidence fetch module 124 can be used to fetch a previously determined or generated OSD confidence value, which is referred to as pnOSD, and transmit pnOSD to the OSD confidence adjustment module 122. The previous OSD confidence fetch module 124 can also transmit pnOSD to a first summing module 126, which is discussed below.

In the example, the selected MV in the MVC (BlkMV) is also sent to the OSD confidence adjustment module 122.

Figure 2:
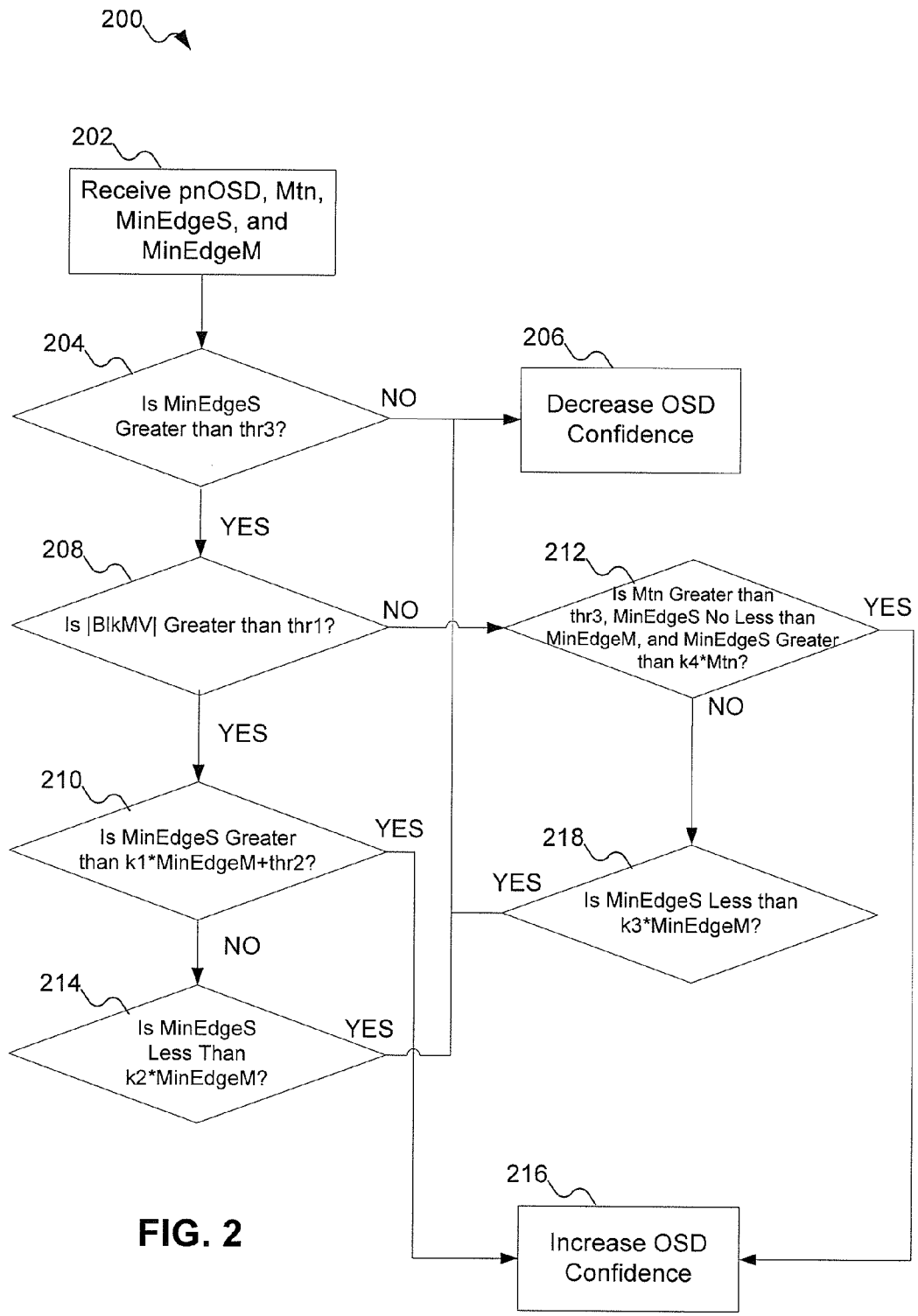
FIG. 2 is a flowchart illustrating an example of a method of adjusting OSD confidence values in accordance with embodiments of the disclosed technology.

FIG. 2 is a flowchart illustrating an example of a method of adjusting OSD confidence 200 in accordance with embodiments of the disclosed technology. The method 200 can be performed by the OSD confidence adjustment module 122, for example. At 202, the OSD confidence adjustment module 122 receives pnOSD, Mtn, MinEdgeS, MinEdgeM, and BlkMV. At 204, MinEdgeS is compared to a threshold thr3. If MinEdgeS exceeds thr3, processing continues to 208; otherwise, the OSD confidence adjustment module 122 decreases the OSD confidence level, as shown at 206, because this determination generally indicates that there is not a stable edge.

At 208, a determination is made as to whether |BlkMV| is greater than another threshold thr1. If |BlkMV| exceeds thr1, processing continues to 210; otherwise, processing continues to 212. This is generally the case where the scene has a stationary edge with a moving background. At 212, a determination is made as to whether Mtn exceeds thr3 and MinEdgeS is no less than MinEdgeM. This is generally the case where there is a small amount of motion in the scene. If Mtn exceeds thr3, MinEdgeS is greater than or equal to MinEdgeM, and MinEdgeS is greater than k4*Mtn, the OSD confidence level is increased, as shown at 216; otherwise, processing continues to 218, where a determination is made as to whether MinEdgeS is less than k3*MinEdgeM. If so, the OSD confidence level is decreased, as shown at 206, because the stationary edge is likely weaker than the moving edge. As used herein, k values (k1, k2, k3, k4, etc.) refer to programmable values that can be used to tune the corresponding algorithm. In certain embodiments, the amount of increase or decrease applied to the OSD confidence level is programmable and, in general, can be different depending on the condition, i.e., depending on which inequality tests are true or false.

At 210, a determination is made as to whether MinEdgeS is greater than k1*MinEdgeM plus a second threshold thr2. If so, the OSD confidence level is increased, as shown at 216. This generally indicates that the stationary edge is stronger than the moving edge. If MinEdgeS is not greater than k1*MinEdgeM plus thr2, however, processing proceeds to 214, where a determination is made as to whether MinEdgeS is less than k2*MinEdgeM. If so, the OSD confidence level is decreased, as shown at 206, because the stationary edge is likely weaker than the moving edge.

Returning to FIG. 1, the first summing module 126 can be used to sum the pixel level OSD edge confidence level in the same MVC block with coring before the current iteration and generate a block-level OSD edge confidence level, which will be referred to as KOSD_Pre. The first summing module 126 can transmit KOSD_Pre to an OSD exit module 132.

The OSD confidence adjustment module 122 can transmit the output pnOSD to a second summing module 128. The OSD confidence adjustment module 122 can also transmit pnOSD to a storage module 130 configured to store the detection result. The second summing module 128 can sum the pixel-level OSD edge confidence level in the same MVC block after the current iteration and obtain a block-level OSD edge confidence level KOSD to be sent to the OSD exit module 132 and also to an OSD dilation module 134.

The OSD exit module 132 can calculate a difference between KOSD_pre and KOSD. If a determination is made that KOSD_Pre is greater than KOSD plus a threshold thr (KOSD_pre>KOSD+thr), the OSD exit module 132 can set the output, which is referred to as exitOSD, to 1. This generally indicates that the OSD has disappeared from the scene. The OSD exit module 132 can transmit the output exitOSD to the OSD dilation module 134.

Figure 3:
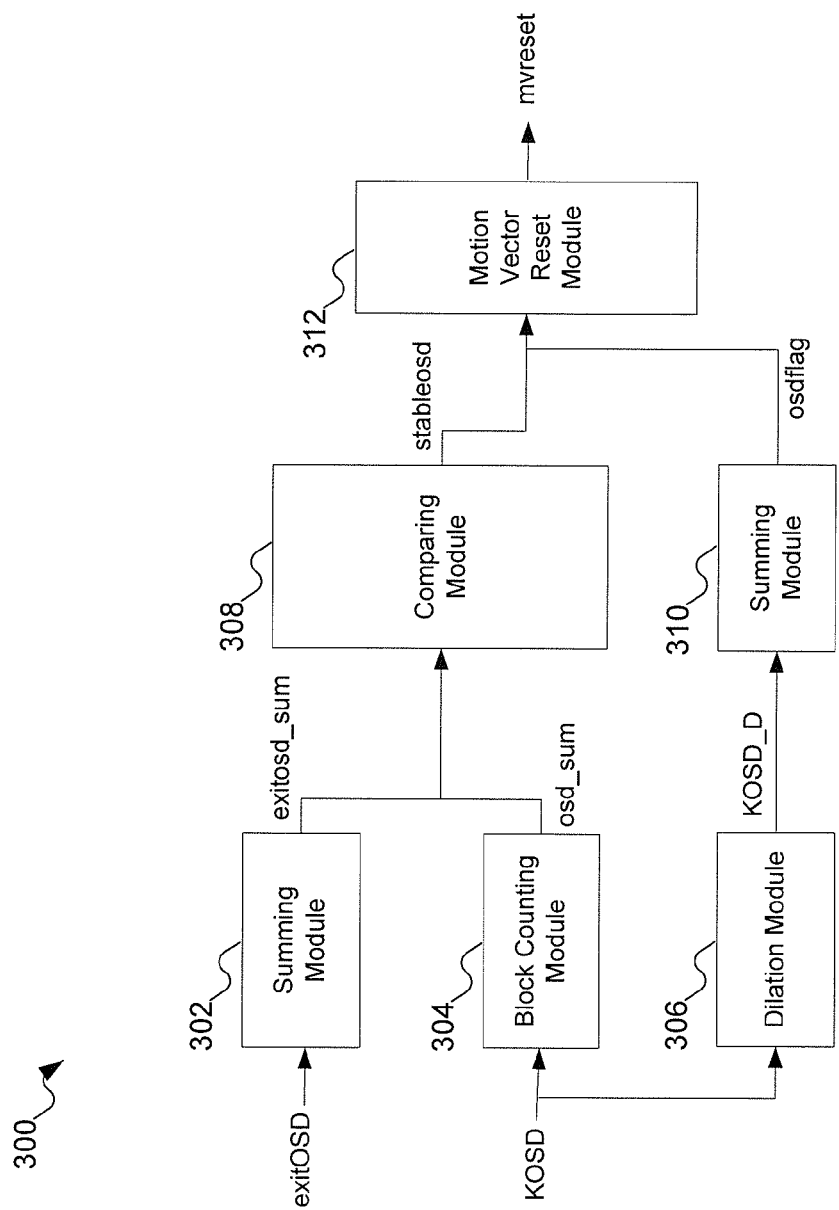
FIG. 3 is a block diagram illustrating an example of an on-screen display (OSD) dilation module implemented as part of an OSD processing system in accordance with embodiments of the disclosed technology.

FIG. 3 is a block diagram illustrating an example of an on-screen display (OSD) dilation module 300 such as the OSD dilation module 134 of FIG. 1. In certain embodiments, the OSD dilation module 134 can use a window, which can be changed according to the amplitude of the MV, for each block.

In the example, the OSD dilation module 300 includes a first summing module 302 that can be used to sum an input, referred to here as exitOSD, in a window. A block counting module 304 receives an input KOSD and can be used to count the number of blocks having a KOSD value that is larger than a particular threshold. The output of the first summing module 302, referred to here as exitosd_sum, and the output of the block counting module 304, referred to here as osd_sum, can both be sent to a comparing module 308. The comparing module 308 can be used to compare the value of exitosd_sum and osd_sum. If the value of exitosd_sum is small compared to the value of k5*osd_sum, for example, the comparing module 308 can transmit an output flag, referred to here as stableOSD, to a MV reset module 312.

A dilation module 306 can receive KOSD and be used to perform dilation processing for the KOSD value in a window. After completing the dilation processing, the dilation module 306 can transmit the output, referred to here as KOSD_D, to a second summing module 310. The second summing module 310 can compare the value of KOSD_D to a threshold thr4 and set a flag for the current block, referred to here as osdflag, to 1 in situations where the value of KOSD_D is larger than or equal to the threshold thr4. The second summing module 310 can transmit the osdflag to the MV reset module 312.

Figure 4:
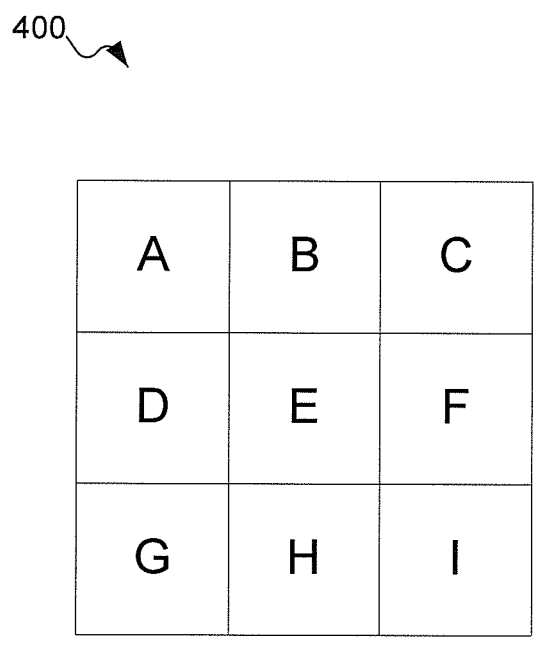

FIG. 4 is a graphical representation of a window dilation 400 in accordance with embodiments of the disclosed technology. The example illustrates a 3×3 window's dilation in which A-I are each used to denote the KOSD value for the corresponding block. In the example, the KOSD values are determined in accordance with the following:

KOSD_0=min(max(A,D), max(F, I));
KOSD_1=min(max(A,B), max(H, I));
KOSD_2=min(max(B,C), max(G, H));
KOSD_3=min(max(C,F), max(D, G));
KOSD_D=max(KOSD_0, max(KOSD_1, max(KOSD_2, max(KOSD_3, E))));

Returning to the example illustrated in FIG. 3, the MV reset module 312 combines the outputs received from the comparing module 308 (stableOSDflag) and the second summing module 310 (osdflag). The MV reset module 312 can then generate an output signal, which is referred to as mvreset.

Returning to FIG. 1, the OSD dilation module 134 can send the output mvreset to a MV handling module 136. In certain embodiments, the MV handling module 136 can set the current block's MV to zero when the value of mvreset received from the OSD dilation module 134 is equal to 1.

The following discussion is intended to provide a brief, general description of a suitable machine (e.g., projector system) in which embodiments of the disclosed technology can be implemented. Typically, the machine includes a system bus to which are attached processors, memory (e.g., random access memory (RAM), read-only memory (ROM), or other state preserving medium), storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal.

The machine may include embedded controllers, such as programmable or non-programmable logic devices or arrays, Application Specific Integrated Circuits (ASICs), embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Embodiments of the disclosed technology may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other tangible storage devices and non-transitory storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the disclosed technology with reference to described embodiments, it will be recognized that the illustrated embodiments may be modified in arrangement and detail without departing from such principles. And although the foregoing discussion has focused on particular embodiments, other configurations are contemplated. In particular, even though expressions such as "according to an embodiment of the disclosed technology" or the like are used herein, these phrases are meant to generally reference embodiment possibilities, and are not intended to limit the invention to any particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An on-screen display (OSD) overlay processing system, comprising:
    a display device;
    a plurality of video data fetch modules configured to receive video data from a video source;
    a video processor configured to cause the display device to visually present to a viewer the video data and an OSD overlay, wherein the OSD overlay includes semi-transparent information and information pertaining to control settings corresponding to the display device and/or other devices in communication with the display device;
    a plurality of overlay edge detection modules each configured to detect an overlay edge of an overlay region within a scene that is represented by the video data, wherein each of the plurality of overlay edge detection modules is coupled with a corresponding one of the plurality of video data fetch modules;
    a plurality of overlay edge processing modules configured to process results from the plurality of overlay edge detection modules, wherein each of the plurality of overlay edge processing modules is coupled with at least one of the plurality of overlay edge detection modules;
    an OSD overlay confidence level adjustment module configured to adjust an OSD overlay confidence level corresponding to the overlay region within the scene, wherein the OSD overlay confidence level adjustment module is coupled with each of the plurality of overlay edge processing modules;
    wherein the data fetch modules, overlay edge detection modules, overlay edge processing modules and OSK overlay confidence level adjustment module are implemented by the video processor.

2. The OSD overlay processing system of claim 1, wherein the plurality of video data fetch modules comprises:
- a first video data fetch module configured to receive video data according to zero MV (0MV) from a current frame (CF); and
- a second video data fetch module configured to receive video data according to 0MV from a previous frame (P1).

3. The OSD overlay processing system of claim 2, wherein the plurality of video data fetch modules further comprises a third video data fetch module configured to receive data according to a selected MV in a motion vector component (MVC).

4. The OSD overlay processing system of claim 3, further comprising a sum of absolute difference (SAD) calculation module configured to determine a difference between CF and PI, wherein the sum of absolute difference (SAD) calculation module is implemented by the video processor.

5. The OSD overlay processing system of claim 4, further comprising a filter module configured to receive and output from the SAD calculation module, reduce noise in the output, and transmit the output to the OSD overlay confidence level adjustment module, wherein the filter module is implemented by the video processor.

6. The OSD overlay processing system of claim 1, further comprising a previous OSD overlay confidence level fetch module configured to provide a previous OSD overlay confidence value to the OSD overlay confidence level adjustment module, wherein the previous OSD overlay confidence level fetch module is implemented by the video processor.

7. The OSD overlay processing system of claim 1, further comprising an OSD overlay dilation module configured to perform a motion vector reset operation based on an output from the OSD overlay confidence level adjustment module, wherein the OSD overlay dilation module is implemented by the video processor.

8. The OSD overlay processing system of claim 1, further comprising a storage module configured to store an output from the OSD overlay confidence level adjustment module.

9. The OSD overlay processing system of claim 1, wherein the semi-transparent information includes channel identification information.

10. A method, comprising:
- receiving video data from a video source, the video data comprising a current frame and a previous frame;
- a display device visually presenting to a viewer the video data and an on-screen display (OSD) overlay, wherein the OSD overlay includes semi-transparent information and information pertaining to control settings corresponding to the display device and/or other devices in communication with the display device;
- detecting an edge of an overlay region within a scene represented by the video data; and
- a processor determining an OSD overlay confidence level corresponding to the overlay region, wherein the OSD overlay confidence level indicates a likelihood that the overlay region corresponds to an the OSD.

11. The method of claim 10, further comprising storing the determined OSD overlay confidence level.

12. The method of claim 10, further comprising adjusting the determined OSD overlay confidence level based at least in part on the detected edge of the region.

13. The method of claim 12, wherein the adjusting comprises increasing the determined OSD overlay confidence level based at least in part on a determination that a stationary edge of the region is stronger than a moving edge of the region.

14. The method of claim 12, wherein the adjusting comprises decreasing the determined OSD overlay confidence level based at least in part on a determination that a stationary edge of the region is weaker than a moving edge of the region.

15. The method of claim 12, wherein the adjusting is further based on a previously stored OSD overlay confidence level.

16. The method of claim 12, further comprising performing a OSD dilation operation on the adjusted OSD overlay confidence level.

17. The method of claim 10, further comprising performing a motion vector (MV) reset operation based on the determined OSD overlay confidence level.

18. One or more tangible and non-transitory computer-readable media storing computer-executable instructions that, when executed by a processor, operate to perform the method according to claim 10.

19. The method of claim 10, wherein the semi-transparent information includes channel identification information.

* * * * *

UNITED STATES PATENT AND TRADEMARK OFFICE
CERTIFICATE OF CORRECTION

| | | |
|---|---|---|
| PATENT NO. | : 9,516,389 B1 | Page 1 of 1 |
| APPLICATION NO. | : 12/966894 | |
| DATED | : December 6, 2016 | |
| INVENTOR(S) | : Guohua Cheng et al. | |

It is certified that error appears in the above-identified patent and that said Letters Patent is hereby corrected as shown below:

In the Claims

Error reads:                                Correction reads:
Column 6, Line 56-57                        "detection modules; and"
"detection modules"

Column 7, Line 17-18                        "CF and P1"
"CF and PI"

Column 8, Line 14                           "corresponds to the"
"corresponds to an the"

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*